United States Patent
Rathinasabapathy et al.

(10) Patent No.: US 11,075,765 B2
(45) Date of Patent: Jul. 27, 2021

(54) SCOPE-BASED CERTIFICATE DEPLOYMENT

(71) Applicant: Microsoft Technology Licensing, LLC, Redmond, WA (US)

(72) Inventors: Mangalam Rathinasabapathy, Bellevue, WA (US); Patrick Simek, Redmond, WA (US); Xinghuo Zeng, Redmond, WA (US); Harpreet Miglani, Redmond, WA (US); Roshane Silva, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/418,337

(22) Filed: May 21, 2019

(65) Prior Publication Data

US 2019/0273621 A1    Sep. 5, 2019

Related U.S. Application Data

(63) Continuation of application No. 15/369,297, filed on Dec. 5, 2016, now Pat. No. 10,320,572.

(Continued)

(51) Int. Cl.
*H04L 29/06* (2006.01)
*H04L 9/32* (2006.01)
(Continued)

(52) U.S. Cl.
CPC ............ *H04L 9/3268* (2013.01); *H04L 9/006* (2013.01); *H04L 9/14* (2013.01); *H04L 9/30* (2013.01);
(Continued)

(58) Field of Classification Search
CPC ......... H04L 9/3268; H04L 9/006; H04L 9/14; H04L 9/30; H04L 9/3247; H04L 9/3263; H04L 9/3265
See application file for complete search history.

(56) References Cited

U.S. PATENT DOCUMENTS 7,711,121 B2 *   5/2010   Hunt ..................... H04L 41/042
                                                        380/282
8,296,267 B2 * 10/2012   Cahill ................. G06F 16/2329
                                                        707/661

(Continued)

FOREIGN PATENT DOCUMENTS

CN   105453105 A   3/2016
CN   105468295 A   4/2016

OTHER PUBLICATIONS

"Office Action Issued in European Patent Application No. 17749293.1", dated Dec. 10, 2019, 7 Pages.

(Continued)

*Primary Examiner* — Sarah Su

(57) ABSTRACT

The techniques described herein facilitate scope-based certificate deployment for secure dedicated tenant access in multi-tenant, cloud-based content and collaboration environments. In some embodiments, a method is described that includes receiving an incoming authentication request from an access system, wherein the authentication request includes metadata, extracting the metadata from the authentication request, and processing the metadata to identify a tenant corresponding to the request. A tenant-specific certificate associated with the tenant is then accessed and provided to the access system for validation by a third-party certificate authority.

17 Claims, 7 Drawing Sheets

Related U.S. Application Data

(60) Provisional application No. 62/370,840, filed on Aug. 4, 2016.

(51) Int. Cl.
*H04L 9/00* (2006.01)
*H04L 9/14* (2006.01)
*H04L 9/30* (2006.01)

(52) U.S. Cl.
CPC .......... *H04L 9/3247* (2013.01); *H04L 9/3263* (2013.01); *H04L 9/3265* (2013.01)

(56) References Cited

U.S. PATENT DOCUMENTS

| | | | | |
|---|---|---|---|---|
| 8,533,453 | B2* | 9/2013 | Miller | H04L 67/1002 |
| | | | | 713/151 |
| 8,560,851 | B1* | 10/2013 | Cherukumudi | H04L 9/3263 |
| | | | | 713/169 |
| 9,148,414 | B1 | 9/2015 | Roth et al. | |
| 9,197,630 | B2* | 11/2015 | Sharif | H04L 63/0823 |
| 9,258,295 | B1* | 2/2016 | Nedeltchev | H04W 12/0023 |
| 9,338,008 | B1* | 5/2016 | Kirkland | H04L 9/083 |
| 2002/0062451 | A1* | 5/2002 | Scheidt | G06Q 20/02 |
| | | | | 726/7 |
| 2006/0080352 | A1* | 4/2006 | Boubez | H04L 69/329 |
| 2006/0265740 | A1 | 11/2006 | Clark et al. | |
| 2007/0005965 | A1* | 1/2007 | Nalliah | H04L 63/0823 |
| | | | | 713/168 |
| 2007/0234422 | A1* | 10/2007 | Piesing | H04N 21/4345 |
| | | | | 726/19 |
| 2009/0138486 | A1* | 5/2009 | Hydrie | G06F 21/50 |
| 2012/0072716 | A1* | 3/2012 | Hu | H04L 63/104 |
| | | | | 713/156 |
| 2013/0111558 | A1* | 5/2013 | Sangubhatla | G06F 21/33 |
| | | | | 726/4 |
| 2013/0198511 | A1* | 8/2013 | Yoo | H04L 63/0823 |
| | | | | 713/156 |
| 2014/0006482 | A1* | 1/2014 | Raghu | H04L 67/10 |
| | | | | 709/203 |
| 2014/0215590 | A1* | 7/2014 | Brand | G06F 9/5072 |
| | | | | 726/6 |
| 2014/0379564 | A1* | 12/2014 | Hsu | G06Q 20/12 |
| | | | | 705/39 |
| 2015/0007263 | A1* | 1/2015 | Stewart | H04L 63/0815 |
| | | | | 726/3 |
| 2015/0222643 | A1* | 8/2015 | Sharif | H04L 63/123 |
| | | | | 713/155 |
| 2016/0019098 | A1* | 1/2016 | Cahill | G06F 9/45533 |
| | | | | 709/222 |
| 2016/0044035 | A1* | 2/2016 | Huang | H04L 41/0806 |
| | | | | 726/4 |
| 2016/0182447 | A1* | 6/2016 | Sasin | H04W 12/06 |
| | | | | 709/226 |
| 2016/0182473 | A1* | 6/2016 | Cignetti | H04L 63/0823 |
| | | | | 713/171 |
| 2016/0182487 | A1* | 6/2016 | Zhu | H04L 63/105 |
| | | | | 726/9 |
| 2016/0315777 | A1* | 10/2016 | Lloyd | H04L 63/0823 |
| 2016/0316025 | A1* | 10/2016 | Lloyd | H04L 63/0823 |
| 2017/0093587 | A1* | 3/2017 | Glisson | H04L 9/321 |
| 2017/0149765 | A1* | 5/2017 | Chang | H04L 63/0869 |
| 2017/0187536 | A1* | 6/2017 | Meriac | H04L 63/0428 |
| 2017/0251076 | A1* | 8/2017 | Bellur | H04L 67/1097 |
| 2017/0373860 | A1* | 12/2017 | Kshirsagar | H04L 63/0823 |
| 2018/0084056 | A1* | 3/2018 | Mowatt | H04L 61/1547 |
| 2018/0123781 | A1* | 5/2018 | Ness | H04L 63/068 |

OTHER PUBLICATIONS

Wang, et al., "Towards Building a Cloud for Scientific Applications", In Journal of Advances in Engineering Software, vol. 42, Issue 9, Sep. 2011, pp. 714-722.

"First Office Action and Search Report Issued in Chinese Patent Application No. 201780048376.1", dated Mar. 25, 2021, 11 Pages.

\* cited by examiner

SCOPE-BASED CERTIFICATE DEPLOYMENT

CROSS REFERENCE TO RELATED APPLICATIONS

This application is a continuation of U.S. application Ser. No. 15,369,297, filed Dec. 5, 2106 and entitled "SCOPE-BASED CERTIFICATE DEPLOYMENT," which claims priority to and benefit from U.S. Provisional Patent Application Ser. No. 62/370,840, filed on Aug. 4, 2016, by the same title, both of which are expressly incorporated by reference herein in their entirety, for all purposes.

BACKGROUND

In cloud-based content and collaboration services such as, for example, Microsoft® SharePoint® Online (SPO) services, SharePoint® server farms are deployed with certificates that enable the service to access other back-end (or external) services such as, for example, Microsoft® Azure®, Microsoft® Exchange®, Fast Search & Transfer ASA (FAST)™ Search, Microsoft® Office®, etc. The SPO services support dedicated tenants via a dedicated service and non-dedicated tenants via a general service. With the dedicated service, a single enterprise may exist in a dedicated environment with its own unique set of certificates for accessing the back-end services. Among other limitations, the dedicated environment requires dedicated certificates, hardware, and networking equipment.

Unfortunately, these dedicated environments can be extremely burdensome to manage and scale. For example, each dedicated environment needs to manage as many as hundreds of certificates for each dedicated tenant. Additionally, the dedicated environments can require dedicated front-end access servers and dedicated content farms that are functionally and physically separated (or isolated) from other dedicated and non-dedicated tenants in a server farm.

Overall, the examples herein of some prior or related systems and their associated limitations are intended to be illustrative and not exclusive. Upon reading the following, other limitations of existing or prior systems will become apparent to those of skill in the art.

OVERVIEW

Examples discussed herein relate to systems and methods of facilitating scope-based certificate deployment for secure, dedicated tenant access in multi-tenant, cloud-based content and collaboration environments. In some embodiments, a method is described that includes receiving an incoming authentication request from an access system, wherein the authentication request includes metadata, extracting the metadata from the authentication request, and processing the metadata to identify a tenant corresponding to the request. A tenant-specific certificate associated with the tenant is then accessed and provided to the access system for validation by a third-party certificate authority.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION OF THE EMBODIMENTS

Figure 1:
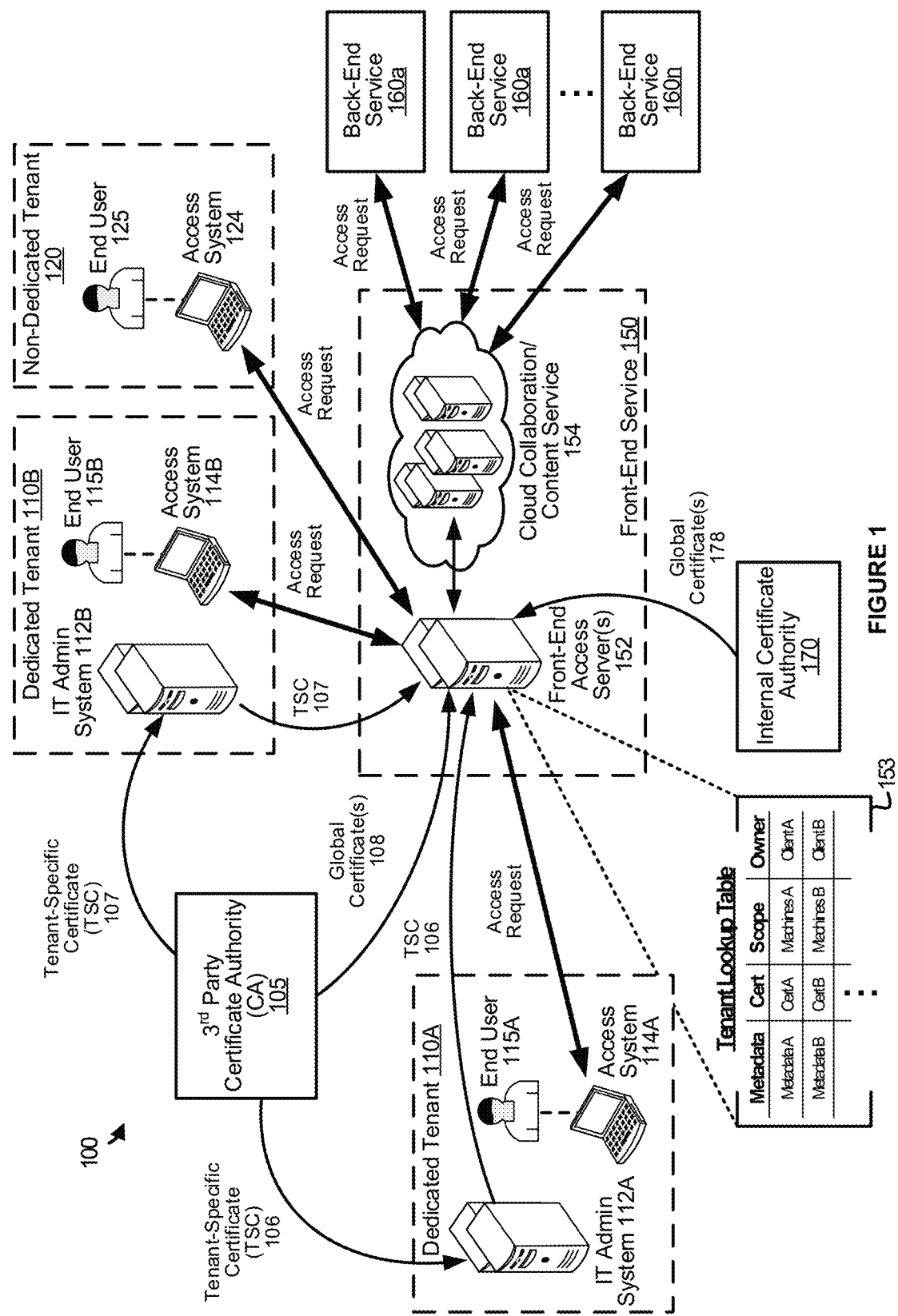
FIG. 1 depicts a block diagram illustrating scope-based certificate deployment for secure, dedicated-tenant access in an example multi-tenant cloud-based content and collaboration operational architecture, in accordance with some embodiments.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a computer readable medium.

In many existing systems, certificates are deployed at a global scale for cloud-based content and collaboration services such as, for example, Microsoft® SharePoint® Online (SPO). In current SPO deployments, a unique environment must be created for each dedicated tenant. Among other features, the unique environment facilitates handling Secure Socket Layer (SSL) termination for vanity domains, and provides enhanced security if a certificate is compromised.

Unfortunately, creating a unique environment for each dedicated client is expensive from both a physical hardware perspective and from a maintenance perspective. For example, a new environment, e.g., offered through a dedicated offering, can include a private domain, a vanity domain, dedicated hardware, and dedicated networking equipment. Moreover, for each new environment, the SPO architecture maintains a unique set of certificates for accessing back-end services including, but not limited to, Azure®, Exchange®, Fast Search & Transfer ASA (FAST)™ Search, Office®, etc.

The techniques described herein facilitate deployment of scope-based certificates for secure, dedicated tenant access in multi-tenant, cloud-based content and collaboration environments. Among other benefits, the scope-based certificates allow data (or content) from dedicated and non-dedicated tenants to reside side-by-side within multi-tenant content farms. The techniques also reduce the number of certificates that need to be managed for dedicated tenants eliminating the need to maintain tenant-specific certificates for each backend service.

At least one technical effect enabled through the techniques is the ability to utilize a tenant's (or client's) own certificate to authenticate and provide scope for tenant access in the multi-tenant, cloud-based content and collaboration environment. As discussed herein, the scope-based certificates provide for dedicated and non-dedicated tenant data (or content) to reside side-by-side within multi-tenant content farms while continuing to provide the enhanced security of siloed (or dedicated) environments. Consequently, if a tenant-specific certificate is compromised, only that tenant (or client) is affected as other tenants in the same environment (dedicated or otherwise), use a different certificate. Additionally, if a multi-tenant certificate is compromised, the scoped certificate need not be re-provisioned. This reduces system downtime, processing resources, etc. Likewise, regional-specific certificates can also be utilized to provide similar technical effect in various regions.

In some embodiments, a unique scope-based tenant-specific certificate is supported and maintained for each dedicated tenant. The tenant-specific certificates are deployed to machines (e.g., in content farms) that contain the dedicated tenant data (or content). For security purposes, the tenant-specific certificates are not deployed to machines that do not contain the dedicated tenant data (or content).

Each certificate can either be a global certificate, a tenant-specific certificate (scoped to machines or content farms on which owner data is stored), a farm-specific certificate (scoped to one or more content farms), or other type of scoped certificate. In some embodiments, the system can change the type of certificate, e.g., from a global certificate to a type of scoped certificate. Additionally, the system can renew global certificates without affecting the scoped certificates and can renew a specific scoped certificate without affecting any other certificates.

The multi-tenant, cloud-based content and collaboration services are primarily discussed herein with reference to Microsoft® SharePoint® Online (SPO). However, the techniques are equally applicable to any content and/or collaboration service. Furthermore, the certificates are primarily discussed herein with reference to SSL termination, however, the certificates can be any public key. For example, among other applications, the certificates discussed herein can be used for email encryption or code signing.

FIG. 1 depicts a block diagram illustrating scope-based certificate deployment for secure, dedicated-tenant access in an example multi-tenant cloud-based content and collaboration operational architecture 100, in accordance with some embodiments.

As shown in the example of FIG. 1, the multi-tenant cloud-based content and collaboration architecture 100 includes a third-party certificate authority (CA) 105, dedicated tenants 110A and 110B, a front-end service 150, back-end systems 160a-160n, and an internal certificate authority 170. The frontend service 150 includes one or more front-end access servers 152 and one or more cloud collaboration/content service 154. The front-end service 150 facilitates scope-based certificate deployment techniques as discussed herein. In some instances, the cloud collaboration/content service 154 can be one or more SPO deployments.

The third-party CA 105 can be any entity that issues digital certificates. A digital certificate can certify the ownership of a public key by the named subject of the certificate. This allows others (relying parties) to rely upon signatures or on assertions made about a private key that corresponds to the certified public key. In this model of trust relationships, a CA is a trusted third party—trusted both by the subject (owner or dedicated tenant) of the certificate and by the party relying upon the certificate (end user associated with the dedicated tenant). The public-key infrastructure (PKI) schemes can be used to implement, for example, https on the web based on, for example, the X.509 standard.

Initially, the third-party CA 105 provides tenant-specific certificates, e.g., TSC 106 and TSC 107, to dedicated tenants, e.g., dedicated tenants 110A and 110B, respectively, and global certificates 108 to the front-end service 150. The internal certificate authority 170 can also provide global certificates 178 to the front-end service 150. As discussed herein, the dedicated tenants, in turn, provide their tenant-specific certificates to the front-end service 150 for scope-based certificate deployment. For example, the third-party CA 105 provides tenant-specific certificates (TSC 106 and TSC 107) to the respective Information Technology (IT) Admin systems 112A and 112B of dedicated tenants 110A and 110B. The dedicated tenants 110A and 110B then provide the tenant-specific certificates 106 and 107 to the front-end service 150 for scoping. Once received, the front-end service 150 can also manages renewals of certificates, etc. As discussed herein, the front-end service 150 may generate a table, e.g., tenant lookup table 153 to identify tenants and provide scope. As shown in the example of FIG. 1, the dedicated tenants 110A and 110B each include a respective IT admin system 112, an access system 114 and an end user 115. Additional or fewer components, systems, administrators, etc., are possible.

Once received, the front-end access server(s) 152 of the front-end service 150 scope the tenant-specific certificates 106 and 107 so that the certificates comprise unique scope-based, tenant-specific certificates that are supported and maintained for each dedicated tenant. The tenant-specific certificates can then be deployed to the machines, e.g., in content farms, that contain the tenant data. The tenant specific certificates are not deployed to machines that do not contain tenant (or customer) data. A more detailed example of an example cloud collaboration/content service 154 is shown and discussed in greater detail with reference to FIG. 2.

In some embodiments, a table (e.g., tenant lookup table 153) stores the certificate information and additional information associated with the scope-based certificates. For example, among other fields, the tenant lookup table 153 can include scope and owner fields (also referred to as ObjectIds). When a request for SSL authentication is received from an access system operated by an end user, e.g., 115A or 115B, of a dedicated tenant, e.g., 114A or 114B, metadata included with the request can be used to identify the dedicated tenant and/or a corresponding scope-based certificate associated with the dedicated tenant. For example, tenant lookup table 153 can be used to differentiate between tenant certificates. In some embodiments, when a request is received by a front-end access server 152, an interrupt can be triggered at the point at which the front-end role receives the incoming request. The system can then analyze the request metadata to identify the specific dedicated tenant that the request belongs to and identify the correct certificate. The system can then use the certificate to terminate SSL. At the very same time if a request was received for a different tenant, that tenant's certificate would be identified and used to terminate SSL in a similar manner. Advantageously, the certificates themselves remain completely secured and isolated to the scope of each tenant. This type of security is typically a critical business and customer requirement.

In some embodiments, the front-end service 150 can include an Application Program Interface (API) which can, among other features, support changing a certificate type from a global certificate to a scoped tenant-specific certificate. To prevent security events, machines on which a scoped certificate is deployed are reimaged upon changes to the certificate. The API can also identify the machines on which certificates are deployed and, for the case of a tenant with vanity domain, support renewing/re-provisioning of the certificate to the new scoped certificate. This process is done at provisioning/static deployment time. The certificate is not selected at runtime.

In some embodiments, when deploying the certificate, the system uses the API to identify all the certificates that need to be placed or deployed (global, specific scoped certificates, etc.). For example, in some implementations, in a normal multi-tenant farm with no dedicated tenants, the API will return only the necessary global certificates. However, on a farm with a single tenant with a vanity domain, the API can return all necessary global certificates and one or more specific scoped certificates.

The improved cloud-based content and collaboration service architecture discussed herein facilitates side-by-side storage of dedicated and non-dedicated tenants in the same environment (e.g., in the same farm or the same machine within a farm). This means that when deploying a certificate for a customer (or dedicated tenant), the deployment should only effect that customer and that customer's farm. The architecture provides the ability to apply a tenant-specific certificate to only the farm in question. Furthermore, the architecture is designed so that deployment can be done at different scope levels within the environment. For example, a cloud-based content and collaboration service can include global certificates, farm-specific certificates and tenant-specific certificates.

Additionally, the improved cloud-based content and collaboration service architecture can include regional-based certificates, e.g., Azure® in Europe has different certificates then Azure® in Asia. The regional-based certificates can be scoped by region. For example, an Azure® certificate can be scoped for Asia (APAC), Europe (EMEA), etc. Consequently, if the EMEA certificate gets compromised, only the EMEA certificate is revoked and renewed. This happens without affecting customers (or tenants) in other regions.

Figure 2:
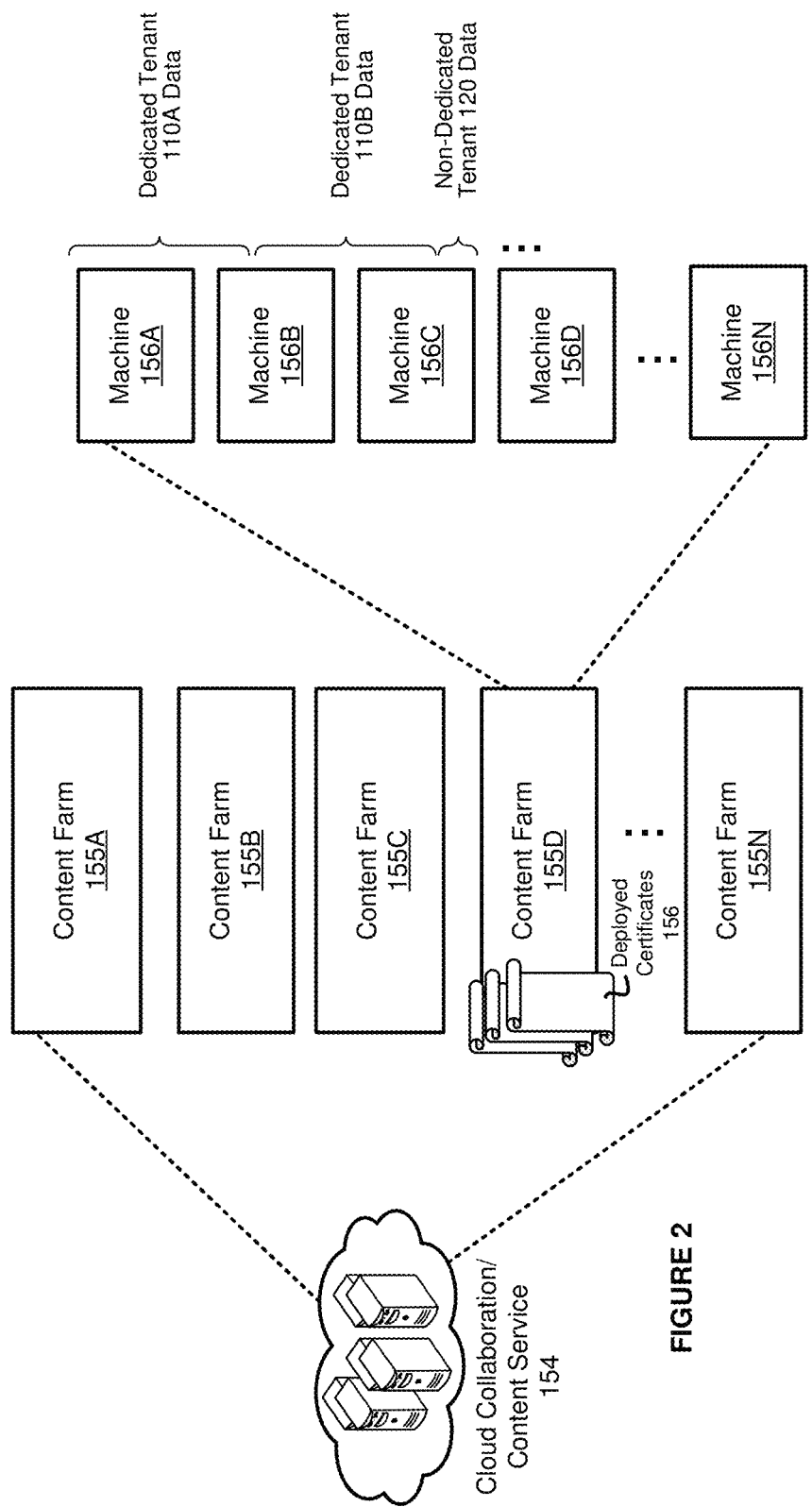
FIG. 2 depicts a block diagram illustrating example components of a cloud collaboration/content service, e.g., cloud collaboration/content service, according to some embodiments.

FIG. 2 depicts a block diagram illustrating example components of a cloud collaboration/content service, e.g., cloud collaboration/content service 154, according to some embodiments. As shown in the example of FIG. 2, the cloud collaboration/content service 154 includes multiple content farms 155A-N, each farm having numerous machines 156A-N.

As discussed herein, the use of scoped certificates facilitates side-by-side storage of dedicated and non-dedicated tenants in the same environment (e.g., in the same farm or even the same machine within a farm) is possible. As shown, certificates 156 are deployed on content farm 155D. The certificates 156 can include one or more tenant-specific certificates for each dedicated tenant, e.g., dedicated tenants 110A and 110B, and a set of global certificates that are shared among the dedicated tenants and the non-dedicated tenants, non-dedicated tenant 120. Non-dedicated tenant 120 includes end user 125 and access system 124.

Figure 3:
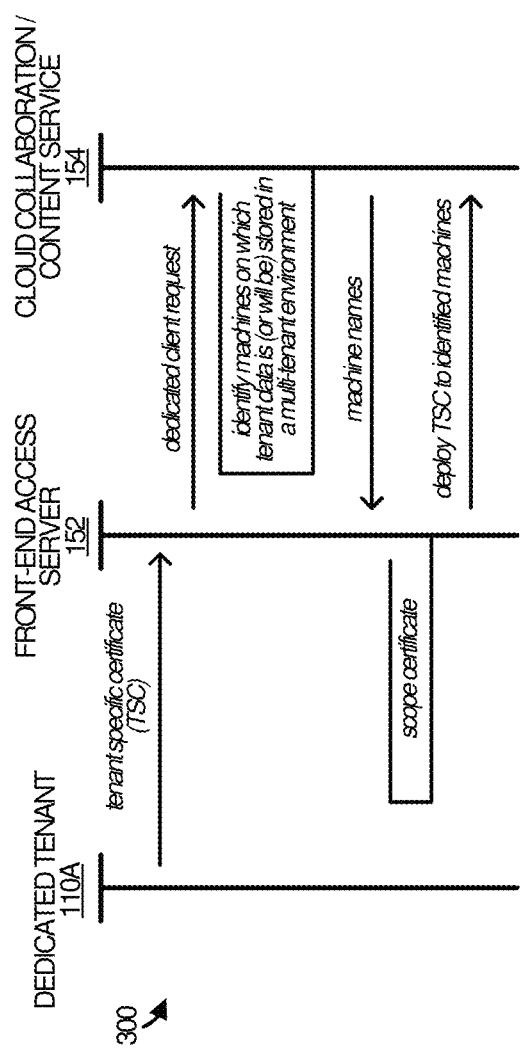
FIG. 3 depicts a sequence diagram illustrating example operations for facilitating scope-based, certificate deployments in a multi-tenant, cloud-based content service, according to some embodiments.
Figure 4:
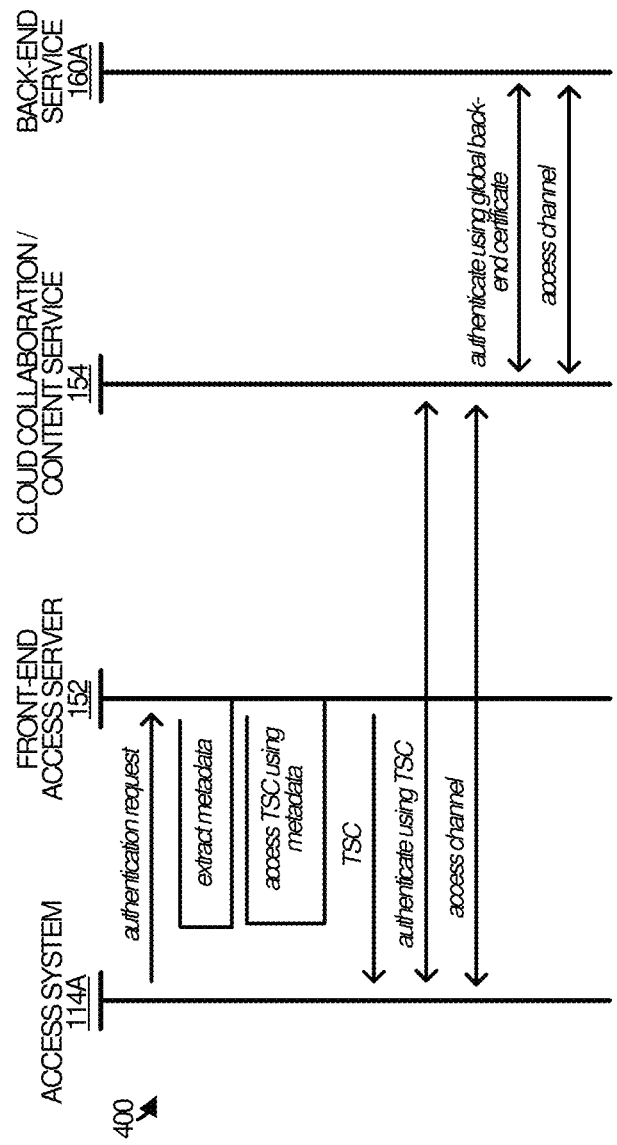
FIG. 4 depicts another sequence diagram illustrating example operations for facilitating scope-based, certificate deployments in a multi-tenant, cloud-based content service, according to some embodiments.

To further illustrate the operation of components of the example multi-tenant cloud-based content and collaboration architecture 100, FIGS. 3 and 4 are provided. FIGS. 3 and 4 illustrate sequence diagrams 300 and 400, respectively.

Referring first to FIG. 3, the sequence diagram 300 depicts example operations for facilitating scope-based, certificate deployments in a multi-tenant, cloud-based content service, according to some embodiments. The sequence diagram 300 includes dedicated tenant 110A, front-end access server 152, and cloud collaboration/content service 154. Additional or fewer components of the example operation architecture 100 are possible.

Initially, dedicated tenant 110A provides a tenant-specific certificate (TSC) to the front-end access server 152. As discussed herein, the TSC can be a certificate issued to dedicated tenant 110A by a third-party certificate authority such as, for example, third-party certificate authority 105. Once received, the dedicated tenant 110A provides the TSC to the front-end service 154. The front-end service 154 responsively identifies machines on which dedicated tenant 110A data is (or will be) stored in a multi-tenant environment and provides an indication of the identified machines to the front-end access server 152. The front-end access server 152 receives the indication of the identified machines and responsively scopes the TSC. The process of scoping the certificate can include associating the TSC with the identified machines and/or generating a tenant lookup table or new entry in an existing tenant lookup table so that the corresponding tenant and associated certificates can be identified responsive to an authentication request (see e.g., FIG. 4). Alternatively or additionally, the scoping can be performed by the cloud collaboration/content service 154. Lastly, the scoped TSC is deployed to the identified machines.

Referring next to FIG. 4, the sequence diagram 400 depicts example operations for facilitating scope-based, certificate deployments in a multi-tenant, cloud-based content service, according to some embodiments. The sequence diagram 400 includes access system 114A, front-end access server 152, cloud collaboration/content service 154, and a back-end service 160A. Additional or fewer components of the example operation architecture 100 are possible.

To begin, access system 114A, which is associated with dedicated tenant 110A, requests authentication from front-end access server 152. The front-end access server 152 receives the request for authentication from the access system 114A and extracts metadata included with the request. The access system 114A then processes the metadata to identify a tenant associated with the request for authentication and accesses a tenant-specific certificate associated with the tenant using the metadata. For example, the system may access the TSC using tenant lookup table 153 and/or an API. Once the TSC is identified, the front-end access server 152 provided the TSC to the access system 114A. The access system 114A authenticates with the cloud collaboration/content service 154 using the TSC to establish an access channel between the access system 114A and the cloud collaboration/content service 154.

As discussed herein, in some instances, the cloud collaboration/content service 154 needs to access back-end services. For example, the cloud collaboration/content service 154 may need to use a global certificate from a set of shared global certificates to access the back-end service 160A. In such instances, the cloud collaboration/content service 154 accesses the global certificate and authenticates with the back-end service 160A using the global certificate to establish an access channel between the cloud collaboration/content service 154 and the back-end service 160A.

Figure 5A:
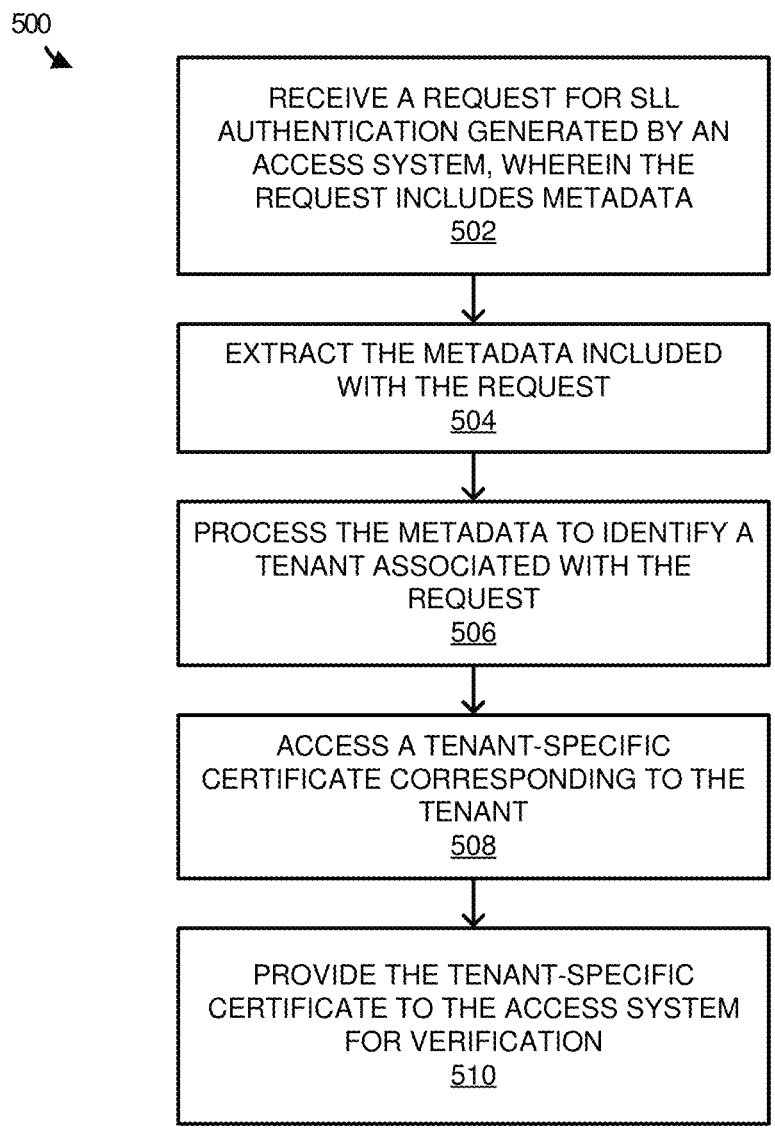
FIGS. 5A and 5B depict flow diagrams illustrating example operations for facilitating deployment of scope-based certificates for respective dedicated tenant and regional access in multi-tenant cloud-based content and collaboration environments, according to some embodiments.

FIG. 5A depicts a flow diagram illustrating example operations 500 for facilitating deployment of scope-based certificates for secure, dedicated-tenant access in multi-tenant, cloud-based content and collaboration environments, according to some embodiments. The example operations 500 may be performed in various embodiments by one or more components of a front-end service 150 of FIG. 1, or one or more processors, and/or other modules, engines, components or tools associated with a front-end access server 152.

Initially, a request for Secure Socket Layer (SSL) authentication generated by an access system is received (502). The request can include metadata used to identify a dedicated tenant. The metadata included with the request is then extracted (504) and processed to identify a dedicated tenant associated with the request (506). A tenant-specific certificate corresponding to the tenant is then accessed (508) and provided to the tenant for validation by a third party certificated authority (510).

Once validated, the dedicated tenant can access the cloud collaboration/content service, e.g., cloud collaboration/content service 154 of FIG. 1. Because the requests from dedicated tenants are handled up front, the cloud collaboration/content service 154 can then manage a single certificate for each back-end service—rather than a whole set of certificates, front-end access servers, etc., for each dedicated tenant.

Figure 5B:
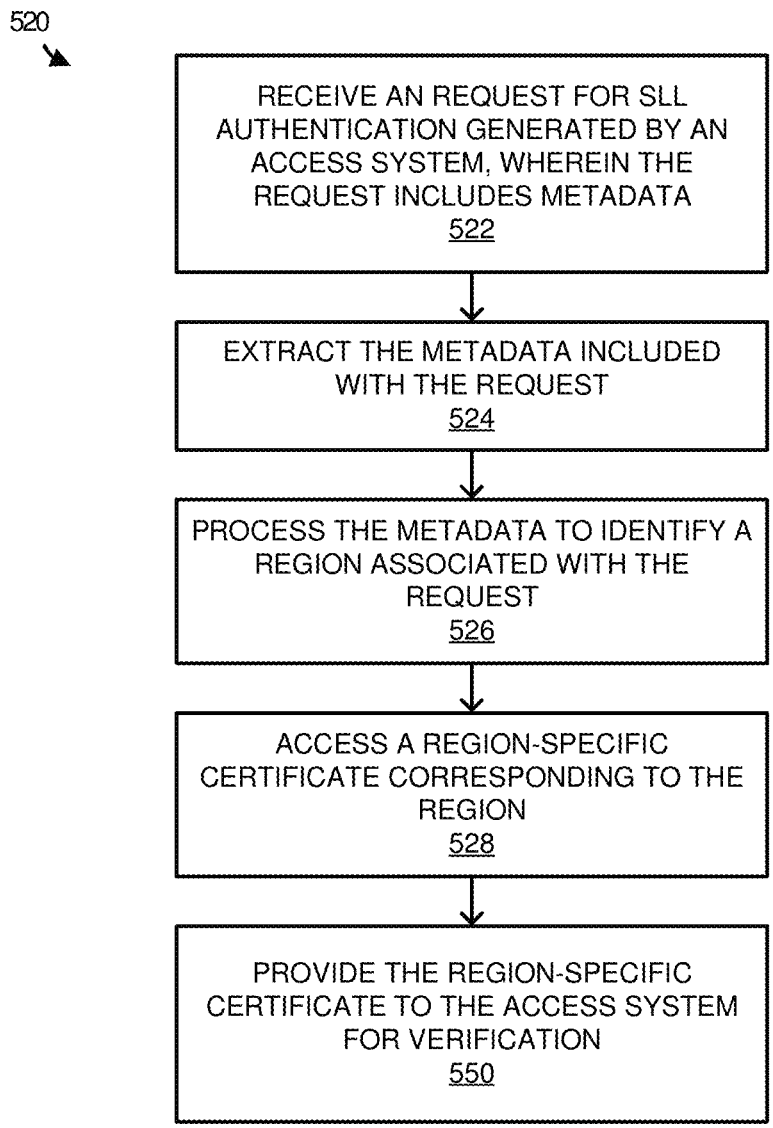

The example of FIG. 5B is similar to the example of FIG. 5A, however, the example of FIG. 5B illustrates secure region-based access as opposed to secure dedicated tenant based access. Additionally, although not shown herein, in some embodiments, requests for authentication can be both regional-based and from a dedicated tenant.

FIG. 5B depicts a flow diagram illustrating example operations 520 facilitating deployment of scope-based certificates for secure region-based access in multi-tenant cloud-based content and collaboration environments, according to some embodiments. The example operations 520 may be performed in various embodiments by one or more components of a front-end service 150 of FIG. 1, or one or more processors, and/or other modules, engines, components or tools associated with a front-end access server 152.

Initially a request for Secure Socket Layer (SSL) authentication generated by an access system is received (522). The request includes metadata. The metadata included with the request is then extracted (524) and processed to identify a dedicated a region associated with the request (526). A region-specific certificate corresponding to the region is then accessed (528) and provided to the tenant for validation by a third party certificated authority (550).

Once validated, the regional tenant can access the cloud collaboration/content service, e.g., cloud collaboration/content service 154 of FIG. 1. Because the requests from regional tenants are handled up front, the cloud collaboration/content service 154 can then manage a single certificate for each back-end service (for all regions)—rather than a whole set of certificates, front-end access servers, etc., for each dedicated region.

Figure 6:
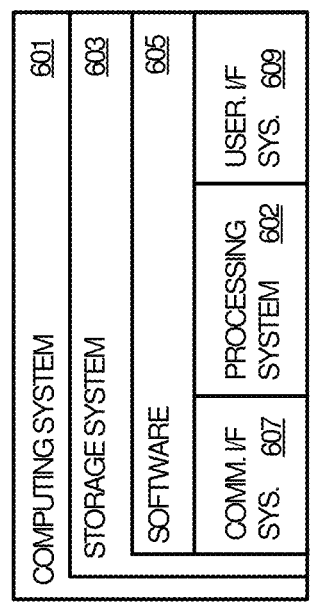
FIG. 6 is a block diagram illustrating a computing system suitable for implementing the scope-based certificate deployment technology disclosed herein, including any of the applications, architectures, elements, processes, and operational scenarios and sequences illustrated in the Figures and discussed below in the Technical Disclosure.

FIG. 6 illustrates computing system 601, which is representative of any system or collection of systems in which the various applications, services, scenarios, and processes disclosed herein may be implemented. For example, computing system 601 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 609. Processing system 602 is operatively coupled with storage system 603, communication interface system 607, and an optional user interface system 609.

Processing system 602 loads and executes software 605 from storage system 603. When executed by processing system 602 for deployment of scope-based certificates in multi-tenant cloud-based content and collaboration environments, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may comprise a micro-processor and other circuitry that retrieves and executes software 605 from storage system 603. Processing system 602 may be implemented within a single processing device, but may also be distributed across multiple processing devices or sub-systems that cooperate in executing program instructions. Examples of processing system 602 include general purpose central processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device, but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions for directing the system to perform the processes described with reference to FIGS. 3-5B.

The program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtual machine software, or application software. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system. Indeed, encoding software on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 609 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 609. In some cases, the input and output devices may be combined in a single device, such as a display capable of displaying images and receiving touch gestures. The aforementioned user input and output devices are well known in the art and need not be discussed at length here. In some cases, the user interface system 609 may be omitted when the computing system 601 is implemented as one or more server computers such as, for example, blade servers, rack servers, or any other type of computing server system (or collection thereof).

User interface system 609 may also include associated user interface software executable by processing system 602 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a front-end access server to a multi-tenant cloud-based content service to facilitate scope-based certificate deployment in the multi-tenant cloud-based content service, the method comprising:
  receiving, by the front-end access server, a tenant-specific certificate from a dedicated tenant system of a first tenant of the multi-tenant cloud-based content service, wherein the front-end access server provides dedicated access control to the multi-tenant cloud-based content service;
  scoping, by the front-end access server, the tenant-specific certificate to the first tenant, the scoping comprising:
    providing the tenant-specific certificate to the multi-tenant cloud-based content service,
    receiving, from the multi-tenant cloud-based content service, a listing of machine identifiers of identified machines used to store tenant data for the first tenant,
    deploying the tenant-specific certificate to the identified machines, and
    storing an association between the identified machines and the tenant-specific certificate;
  receiving, by the front-end access server, a request for authentication including metadata from an access system of the first tenant;
  processing, by the front-end access server, the metadata to identify the first tenant and the tenant-specific certificate associated with the first tenant;
  providing, by the front-end access server, the tenant-specific certificate to the access system for authentication on the multi-tenant cloud-based content service.

2. The method of claim 1, wherein the tenant-specific certificate comprises one or more of a Secure Socket Layer (SSL) certificate, an email encryption certificate, or a code signing certificate.

3. The method of claim 1, wherein the tenant-specific certificate comprises a certificate issued to the first tenant by a third-party certificate authority.

4. The method of claim 1, further comprising deploying global certificates to the machines.

5. The method of claim 1, further comprising:
  receiving a request from the access system, wherein fulfilling the request requires accessing a back-end service;
  identifying a shared certificate corresponding to the back-end service; and
  authenticating with the back-end service using the shared certificate.

6. The method of claim 1, further comprising authenticating a server using the tenant-specific certificate.

7. The method of claim 1, further comprising:
  receiving, by an Application Program Interface (API), a request to change a type of a first certificate from a global certificate to a scope-based certificate.

8. The method of claim 7, further comprising:
  responsive to receiving the request to change the type of the first certificate, identifying machines on which the first certificate is deployed; and
  reimaging the machines on which the first certificate is deployed.

9. A computer readable storage medium having program instructions stored thereon which, when executed by one or more processors, cause the one or more processors to:
  receive a tenant-specific certificate from a dedicated tenant system of a first tenant of a multi-tenant cloud-based content service;
  scope the tenant-specific certificate to the first tenant by causing the one or more processors to:
    provide the tenant-specific certificate to the multi-tenant cloud-based content service,
    receive, from the multi-tenant cloud-based content service, a listing of machine identifiers of identified machines used to store tenant data for the first tenant,
    deploy the tenant-specific certificate to the identified machines, and
    store an association between the identified machines and the tenant-specific certificate;
  trigger an interrupt responsive to receiving a request for authentication from an access system of the first tenant, wherein the authentication request includes metadata;
  process the metadata to identify the first tenant and the tenant-specific certificate associated with the first tenant; and
  provide the tenant-specific certificate to the access system for authentication on the multi-tenant cloud-based content service.

10. The computer readable storage medium of claim 9, wherein the tenant-specific certificate comprises one or more of a Secure Socket Layer (SSL) certificate, an email encryption certificate, or a code signing certificate.

11. The computer readable storage medium of claim 9, wherein the tenant-specific certificate comprises a certificate issued to the first tenant by a third-party certificate authority.

12. The computer readable storage medium of claim 9, wherein the instructions, when executed by the one or more processors, further cause the one or more processors to deploy global certificates to the machines.

13. The computer readable storage medium of claim 9, wherein the instructions, when executed by the one or more processors, further cause the one or more processors to
  receive a request from the access system, wherein fulfilling the request requires accessing a back-end service;
  identify a shared certificate corresponding to the back-end service; and
  authenticate with the back-end service using the shared certificate.

14. The computer readable storage medium of claim 9, wherein the instructions, when executed by the one or more processors, further cause the one or more processors to, responsive to receiving a request to change a type of a first certificate from a global certificate to a scope-based certificate:
  modify the type of the first certificate,
  identify machines on which the first certificate is deployed; and
  reimage the machines on which the first certificate is deployed.

15. A method of operating a front-end access server to a multi-tenant cloud-based content service to facilitate scope-based certificate deployment in the multi-tenant cloud-based content service, the method comprising:
  receiving, by the front-end access server, at least one scope-based certificate, wherein the front-end access server provides dedicated access control to the multi-tenant cloud-based content service;
  scoping, by the front-end access server, each of the at least one scope-based certificate to a respective scope within the multi-tenant cloud-based content service, wherein the scoping comprises, for each of the at least one scope-based certificates:
    providing the respective scope-based certificate to the multi-tenant cloud-based content service,
    receiving, from the multi-tenant cloud-based content service, a listing of machine identifiers of identified machines used to store tenant data for the respective tenant associated with the respective scope-based certificate, deploying the respective tenant-specific certificate to the identified machines, and storing an association between the identified machines and the respective tenant-specific certificate;

receiving, by the front-end access server, a request for authentication from an access system, wherein the request includes metadata;

processing, by the front-end access server, the metadata to identify a scope-based certificate of the at least one scope-based certificate, the scope-based certificate corresponding to the request;

and providing, by the front-end access server, the scope-based certificate to the access system for authentication on the multi-tenant cloud-based content service.

16. The method of claim 15, wherein the respective scope of the scope-based certificate comprises one or more of a particular region or content farm.

17. The method of claim 15, wherein the scope-based certificate comprises one or more of a Secure Socket Layer (SSL) certificate, an email encryption certificate, or a code signing certificate.

\* \* \* \* \*